United States Patent
Park

(10) Patent No.: US 9,305,482 B2
(45) Date of Patent: Apr. 5, 2016

(54) DISPLAY DEVICE AND METHOD OF CALIBRATING COLOR

(71) Applicant: SAMSUNG ELECTRONICS CO., LTD., Suwon-si (KR)

(72) Inventor: Ji-yong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 13/731,601

(22) Filed: Dec. 31, 2012

(65) Prior Publication Data

US 2013/0169700 A1 Jul. 4, 2013

(30) Foreign Application Priority Data

Dec. 29, 2011 (KR) .................. 10-2011-0145432

(51) Int. Cl.
G09G 3/20 (2006.01)
G09G 5/02 (2006.01)
G01J 3/50 (2006.01)
G01J 3/02 (2006.01)
G01J 3/52 (2006.01)
H04N 1/60 (2006.01)
G06F 3/14 (2006.01)

(52) U.S. Cl.
CPC .............. *G09G 3/2003* (2013.01); *G01J 3/0264* (2013.01); *G01J 3/506* (2013.01); *G01J 3/52* (2013.01); *G09G 5/02* (2013.01); *H04N 1/603* (2013.01); *G06F 3/14* (2013.01); *G09G 2320/0606* (2013.01); *G09G 2320/0666* (2013.01); *G09G 2320/0693* (2013.01); *G09G 2360/145* (2013.01)

(58) Field of Classification Search
CPC ..... H04N 1/60; H04N 1/6052; H04N 1/6055; G09G 2320/0693
See application file for complete search history.

(56) References Cited

U.S. PATENT DOCUMENTS

| | | | |
|---|---|---|---|
| 5,739,809 A * | 4/1998 | McLaughlin et al. | ........ 345/594 |
| 5,918,192 A | 6/1999 | Tomaszewski | |
| 2004/0257598 A1 | 12/2004 | Fujio et al. | |
| 2008/0279451 A1 * | 11/2008 | Shimbaru | ..................... 382/167 |

FOREIGN PATENT DOCUMENTS

WO 00/29935 A1 5/2000

OTHER PUBLICATIONS

Communication from the European Patent Office issued Apr. 16, 2013 in counterpart European Application No. 12199414.9.

* cited by examiner

*Primary Examiner* — Antonio A Caschera
(74) *Attorney, Agent, or Firm* — Sughrue Mion, PLLC

(57) ABSTRACT

A display device includes an image acquisition device, a display which displays a reference color standard and displays a color standard acquired by photographing on a screen the reference color standard through the image acquisition device, a color measurer which measures color of the acquired color standard displayed on the screen of the display, and a color calibrator which calibrates colors of an image acquired through photographing by the image acquisition device using color information measured by the color measurer.

13 Claims, 8 Drawing Sheets

DISPLAY DEVICE AND METHOD OF CALIBRATING COLOR

CROSS-REFERENCE TO RELATED APPLICATION

This application claims the benefit of Korean Patent Application No. 2011-0145432, filed on Dec. 29, 2011 in the Korean Intellectual Property Office, the disclosure of which is incorporated herein by reference, in its entirety.

BACKGROUND

1. Field

Exemplary embodiments of the inventive concept relate to a display device which displays an image acquired by an image acquisition device through photographing on a screen, or which transmits the image through a network, and a method of calibrating color of the display device.

2. Description of the Related Art

A display device displays an image based on an input image signal, and recently may support remote image transmission in which image data is transmitted and received through a network. Thereby, the display device may remotely transmit an image to another display device, a personal computer or a mobile terminal through a network.

Further, technology for calibrating colors of an image displayed by a display has become so widespread that the display device may reproduce actual colors. One example of such a technology will be described. First, a color patch is displayed on a screen of the display device. A color sensor which contacts the screen of the display device is located on the screen of the display device. Colors of an arbitrary region of an image displayed on the screen are measured by the color sensor. Color information which has been measured is then transmitted to a personal computer connected to the color sensor or the display device, and a user calibrates colors of the display device based on the color information of the image which has been measured by the color sensor. However, a display device including an image acquisition device, such as a camera, includes a function of calibrating colors of an image displayed on a screen of the display device, but does not include a function of calibrating colors of an image acquired through photographing by the image acquisition unit. Therefore, in response to the display device including the image acquisition device transmitting the image acquired through photographing by the image acquisition unit to another display device through a network, the display device receiving the acquired image may reproduce an image of colors which differ from actual colors.

SUMMARY

Therefore, it is an aspect of the inventive concept to provide a display device which calibrates colors of an image acquired by an image acquisition device through photographing, and a method of calibrating color of the display device.

Additional aspects of the inventive concept will be set forth in part in the description which follows and, in part, will be obvious from the description, or may be learned by practice of the exemplary embodiments of the inventive concept.

In accordance with one aspect of the inventive concept, a display device includes an image acquisition device, a display which displays a reference color standard and displays on a screen a color standard acquired by photographing the reference color standard through the image acquisition device, a color measurer which measures the color of the acquired color standard displayed on the screen of the display, and a color calibrator which calibrates colors of an image acquired by the image acquisition device through photographing using color information measured by the color measurer.

The display may display the reference color standard photographed by the image acquisition device and the color standard, the color of which is measured by the color measurer, at different positions of the screen.

The color calibrator may calibrate the color of the color standard acquired by the image acquisition device, and the display may display on the screen the color standard, the color of which has been calibrated.

The display device may further include an image transmitter which transmits the image through a network, the colors of which have been calibrated.

The image transmitter may transmit the image, the colors of which have been calibrated, by using a multimedia over internet protocol (MoIP).

In accordance with another aspect of the inventive concept, a display device includes an image acquisition device, a display which displays an image of a subject acquired by photographing the subject through the image acquisition device on a screen, and a color calibrator which calibrates colors of the image of the subject acquired by the image acquisition device according to a user input.

The display may display the image of the subject on the screen, the colors of which have been calibrated.

The display device may further include an image transmitter which transmits the image of the subject through a network, the colors of which have been calibrated.

The color calibrator may calibrate the colors according to profile information selected by a user from among profile information stored in advance.

The color calibrator may calibrate the colors according to user input including at least one of luminance, color gamut, gamma and white balance.

The image transmitter may transmit the image of the subject, the colors of which have been calibrated, using a multimedia over internet protocol (MoIP).

In accordance with another aspect of the inventive concept, a method of calibrating color of a display device includes displaying a reference color standard on a screen of a display, and photographing the reference color standard through an image acquisition device, displaying a color standard acquired by photographing the reference color standard through the image acquisition device on the screen of the display, and measuring color of the acquired color standard displayed on the screen, and calibrating colors of an image acquired by the image acquisition device through photographing using color information measured by the color measurer.

The photographing of the reference color standard may include displaying the reference color standard at one position of the screen of the display, and the measuring of the color of the acquired color standard may include displaying the acquired color standard at the other position of the screen of the display.

The method of calibrating color may further include calibrating the color of the color standard acquired by the image acquisition device, and displaying on the screen of the display the color standard, the color of which has been calibrated.

The method of calibrating color may further include transmitting the image through a network, the colors of which have been calibrated.

In the transmission of the image, the colors of which have been calibrated, the image, the colors of which have been calibrated, may be transmitted using a multimedia over internet protocol (MoIP).

In accordance with a further aspect of the inventive concept, a method of calibrating color of a display device includes photographing a subject through an image acquisition device, displaying on a screen of a display, an image of the subject acquired by the image acquisition device, and calibrating colors of the image of the subject acquired by the image acquisition device according to a user input.

The method of calibrating color may further include displaying on the screen of the display the image of the subject, the colors of which have been calibrated.

The method of calibrating color may further include transmitting, through a network, the image of the subject, the colors of which have been calibrated.

In the calibration of the colors of the image of the subject, the colors may be calibrated according to profile information selected by a user from among profile information stored in advance.

In the calibration of the colors of the image of the subject, the colors may be calibrated according to a user input including at least one of luminance, color gamut, gamma level and white balance.

In the transmission of the image of the subject, the colors of which have been calibrated, the image, the colors of which have been calibrated, may be transmitted using a multimedia over internet protocol (MoIP).

An exemplary embodiment may further include a display device including: a display which displays a reference color standard and a color standard; a color measurer which measures color of the color standard; and a color calibrator which calibrates colors of an image acquired using color information measured by the color measurer.

An exemplary embodiment may further include an image acquisition device; wherein the color standard is acquired by photographing the reference color standard through the image acquisition device. The image calibrated by the color calibrator may be acquired by the image acquisition device. An image transmitter may transmit the image with the calibrated colors through a network.

BRIEF DESCRIPTION OF THE DRAWINGS

These and/or other aspects of the inventive concept will become apparent and more readily appreciated from the following description of the exemplary embodiments, taken in conjunction with the accompanying drawings of which.

DETAILED DESCRIPTION

Figure 1:
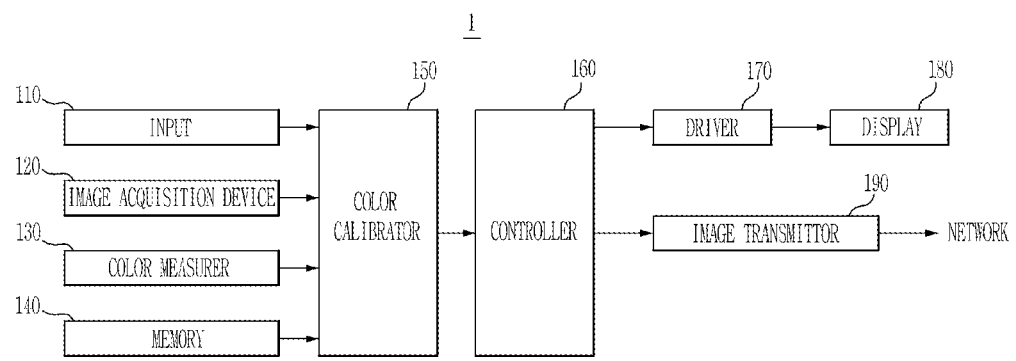
FIG. 1 is a block diagram illustrating the configuration of a display device in accordance with an exemplary embodiment of the inventive concept.

Reference will now be made in detail to the exemplary embodiments of the inventive concept, examples of which are illustrated in the accompanying drawings, wherein like reference numerals refer to like elements throughout.

FIG. 1 is a block diagram illustrating the configuration of a display device 1 in accordance with one exemplary embodiment of the inventive concept.

With reference to FIG. 1, the display device 1 includes an input 110 to which profile information is input, an image acquisition device 120 photographing a subject, a color measurer 130 which measures colors, a memory 140 which stores color and profile information, a color calibration device 150 which generates a profile, a controller 160 which controls the overall operation of the display device 1, a display 180 which displays an image, a drive 170 which drives the display t 180, and an image transmitter 190 which transmits the image.

The input 110 receives profile information input by a user, and transmits the received profile information to the color calibrator 150. The input 110 includes clickable buttons or a touch panel in order to receive the profile information from the user. The clickable buttons or the touch panel may be formed on the outer surface of the display device 1 or may be formed on a remote controller applied to the display device 1.

The image acquisition device 120 photographs an arbitrary subject, or photographs an image displayed on a screen 10 of the display 180. For this purpose, the image acquisition device 120 may include an image sensor, such as a CMOS sensor or a CCD sensor. Further, the image acquisition device 120 transmits an acquired, photographed image signal to the color calibrator 150.

The color measurer 130 measures colors of the image displayed on the screen 10 of the display 180. For this purpose, the color measurer 130 may include a color sensor which measures colors. Further, the color measurer 130 measures three stimulus values (X, Y, Z) of the colors of the image displayed on the screen 10. Further, the color measurer 130 transmits the measured three stimulus values to the color calibrator 150.

The memory 140 includes a memory device for a storage space, such as a DRAM or an EEPROM and stores color and profile information. The profile information stored in the memory 140 may be profile information generated by the color calibrator 150 or may be profile information for reproducing general colors of the display 180. A profile reproducing general colors of the display 180 may include a profile causing the display 180 to reproduce colors while satisfying a general condition which is not an optimum condition. The memory 140 may be physically connected to the color calibrator 150, or may be provided within the display 1 but separately from the color calibrator 150.

The color calibrator 150 generates a profile using the colors measured by the color measurer 130, and calibrates colors of an image using the profile. Here, the image, colors of which are calibrated by the color calibrator 150, includes an image acquired by the image acquisition device 120 through photographing and transmitted through a network, in addition to an image input to the display device 1 and displayed on the screen 10 of the display 180. The color calibrator 150 may be provided within the display device 1, or may be provided outside of the display device 1 so as to be connected to the display device 1. In response to the color calibrator 150 being provided at the outside of the display device 1, the color calibrator 150 may be provided in the form of hardware or software of a personal computer. In this case, the personal computer may include the display device 1 and a communication interface, and receives through photographing, the image signal acquired by the image acquisition device 120, the colors measured by the color measurer 130, profile information input by a user, etc., through the communication interface.

The color calibrator 150 receives color information measured by the color measurer 130, and calculates a difference between the measured actual color information and the original color information. The original color information may be stored in advance in the color calibrator 150 or the memory 140. Further, the color calibrator 150 generates a profile reproducing optimized colors on the display 180 using the difference in the calculated color information. The profile generally refers to an international color consortium (ICC) file or an image color matching (ICM) file which is generally applicable to an arbitrary display 180. The ICC file or the ICM file is a data file representing color characteristics of the display 180, and generally refers to a profile causing the display 180 to display actual colors.

The controller 160 receives the image signal, colors of which have been calibrated, from the color calibrator 150. Further, the controller 160 transmits the image signal, colors of which have been calibrated, to the driver 170 or the image transmitter 190. Further, the controller 160 drives the display 180 through the driver 170, and the driver 170 supplies operating voltage to the display 180 according to control instructions from the controller 160, thereby causing an image, colors of which are calibrated, to be displayed on the screen 10 of the display 180.

The display 180 displays an image on the screen 10. The image displayed on the screen 10 of the display 180 includes an image signal photographed by the image acquisition device 120 and transmitted from the image acquisition device 120 in addition to an image signal transmitted from the outside and received by the display device 1. For this reason, the display 180 includes a display panel, such as an LCD, a PDP, a CRT, an OLED, etc. Further, the display 180 may support sRGB as a standard color space, and thus the R, G and B values of the image displayed on the screen 10 of the display 180 may be measured as the corresponding X, Y and Z values.

The display 180 and the image acquisition device 120 have various color reproducing characteristics due to electrical, physical and optical characteristics thereof. In order to display actual colors, they require color calibration. For this purpose, the display 180 displays a predetermined image on the screen 10 according to control instructions from the controller 160, and the color measurer 130 measures colors of an arbitrary region of the image displayed on the screen 10.

The image transmitter 190 transmits the image signal received from the controller 160 through a network. The image transmitter 190 performs pretreatment, encoding and packetization of the received image signal prior to transmission of the received image signal, and then transmits the image signal through the network. For example, a multimedia over internet protocol (MoIP) may be used as the network.

Figure 2:
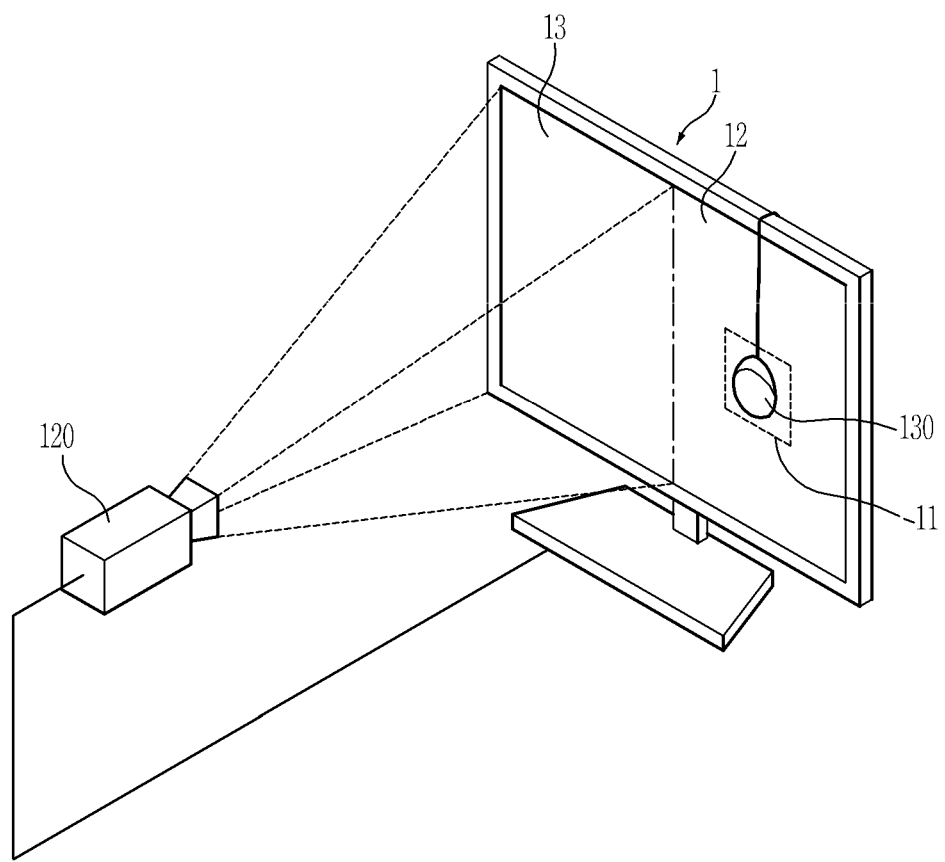
FIG. 2 is a view illustrating a color calibration process of the display device in accordance with the an exemplary embodiment of the inventive concept.

FIG. 2 is a view illustrating a color calibration process of the display device in accordance with an exemplary embodiment of the inventive concept.

With reference to FIG. 2, a predetermined reference color standard is displayed on a region 13 of the screen 10 of the display of display device 1. Then, the reference color standard displayed on the region 13 of the screen 10 of the display is photographed by the image acquisition device 120. A color standard acquired by the image acquisition device 120 by photographing the reference color standard is transmitted to the display, and is displayed on a region 12 of the screen 10 of the display. The display may display the reference color standard photographed by the image acquisition unit 120 and the color standard, color of which is measured by the color measurer 130, at different positions of the screen 10.

Thereby, the screen 10 of the display may be divided into plural regions, and the reference color standard may be displayed at one position of the screen 10 of the display, for example, in the left region 13. Further, the color measurer 130 may be located at another position of the screen 10 of the display, for example, in the right region 12. The color measurer 130 measures colors of an arbitrary region 11 of an image displayed on the right region 12 of screen 10. That is, the color measurer 130 measures the color of the color standard acquired by the image acquisition device 120 through photographing the reference color standard. The color measurer 130 may measure three stimulus values of color of the acquired color standard.

The color measurer 130 may be installed at the inside of the display device 1, and may measure an image displayed by the display of the display device 1. Further, the image acquisition device 120, including the image sensor, may be embedded in the outer surface of the display device 1, and may photograph the image displayed by the display through the use of refraction, reflection, etc.

Although FIG. 2 illustrates the screen 10 of the display unit as being divided into plural regions so as to allow a color standard displayed on the screen 10 of the display to be photographed by the image acquisition unit 120 and then to allow a color standard acquired by the image acquisition device 120 by photographing the reference color standard to be displayed again on the screen 10 of the display, the screen 10 of the display may be divided according to time or space.

Figure 3:
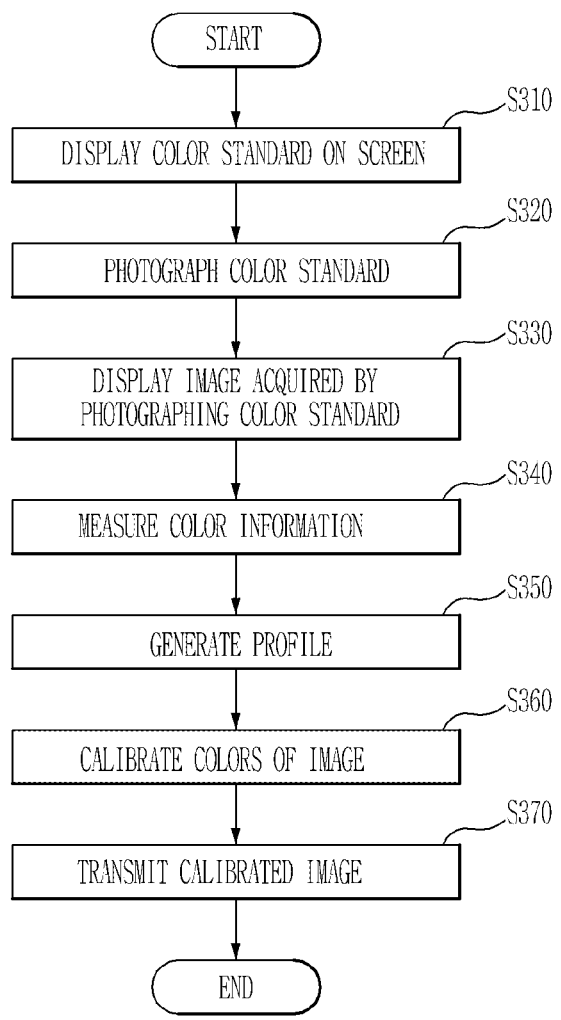
FIG. 3 is a flowchart schematically illustrating a method of calibrating color of the display device in accordance with an exemplary embodiment of the inventive concept.

FIG. 3 is a flowchart schematically illustrating a method of calibrating color of the display device in accordance with an exemplary embodiment of the inventive concept.

With reference to FIG. 3, the method of calibrating color of the display device 1 includes photographing a color standard using the image acquisition device 120, measuring color of the color standard acquired through photographing, and calibrating colors of an image using the measured color information.

First, the display 180 displays a predetermined color standard on screen 10, according to control instructions received from the controller 150 (Operation S310). The color standard includes a patch for an arbitrary color. Here, the color standard refers to a color patch having a color becoming a reference in color calibration of the display 180 or the image acquisition device 120. This results in the color standard having an original color for an arbitrary color, and the original color is digitized.

Thereafter, the image acquisition device 120 photographs the predetermined color standard (Operation S320). That is, the image acquisition device 120 photographs the color standard displayed on the screen 10 of the display 180, and transmits an image signal of the color standard acquired through photographing to the color calibrator 150.

Thereafter, an image of the color standard acquired through photographing the reference color standard by the image acquisition device 120 is displayed on the screen 10 of the display t 180 (Operation S330). The image signal of the color standard acquired through photographing the reference color standard by the image acquisition 120 is transmitted to the controller 160 through the color calibrator 150, and the controller 160 drives the display 180 so that the image of the color standard acquired through photographing the reference color standard by the image acquisition device 120 is displayed on the screen 10.

Thereafter, the color of the color standard acquired through photographing the reference color standard by the image acquisition device 120 and displayed on the screen 10 of the display 180 is measured (Operation S340). The color of the color standard acquired through photographing the reference color standard by the image acquisition device 120 is measured by the color measurer 130, and the color of the color standard measured by the color measurer 130 may be an actual color.

Thereafter, a profile calibrating colors of an image acquired through photographing by the image acquisition device 120 is generated using the actual color measured by the color measurer 130 (Operation S350). The color calibrator 150 receives color information measured by the color measurer 130 and calculates a difference between the actual color information and original color information. Then, the color calibrator 150 generates a profile reproducing optimized colors on the display 180 using the difference in the calculated color information. Here, the generated profile serves to not only allow the display 180 to reproduce optimized colors, but also serves to calibrate the image acquired through photographing by the image acquisition device 120 so as to reproduce optimized colors and to transmit the calibrated image through a network.

Therefore, the color calibrator 150 calibrates colors of an image acquired by the image acquisition device 120 through photographing using the generated profile (Operation S360). That is, the color calibrator 150 uses the profile to calibrate colors of an image signal transmitted from the image acquisition device 120. Thereby, the image acquired through photographing by the image acquisition device 120 reproduces actual colors.

The color calibrator 150 may calibrate the color of the color standard acquired by the image acquisition device 120, and the image of the color standard image, the color of which has been calibrated, may be displayed on the screen 10 of the display 180. In response to the image of the color standard image almost coinciding with the predetermined color standard displayed on the screen 10 of the display 180, the profile generated by the color calibrator 150 may be accepted according to user input. Additionally, the profile generated by the color calibrator 150 may be stored in the memory 140, and subsequently a user may select a setting item of the profile through the use of a menu.

Thereafter, the image, the colors of which have been calibrated, may be transmitted through the network (Operation S370). The image transmitter 190 may perform pretreatment, encoding and packetization of the received image signal, the colors of which have been calibrated, and may transmit the image signal through a multimedia over internet protocol (MoIP).

Figure 4:
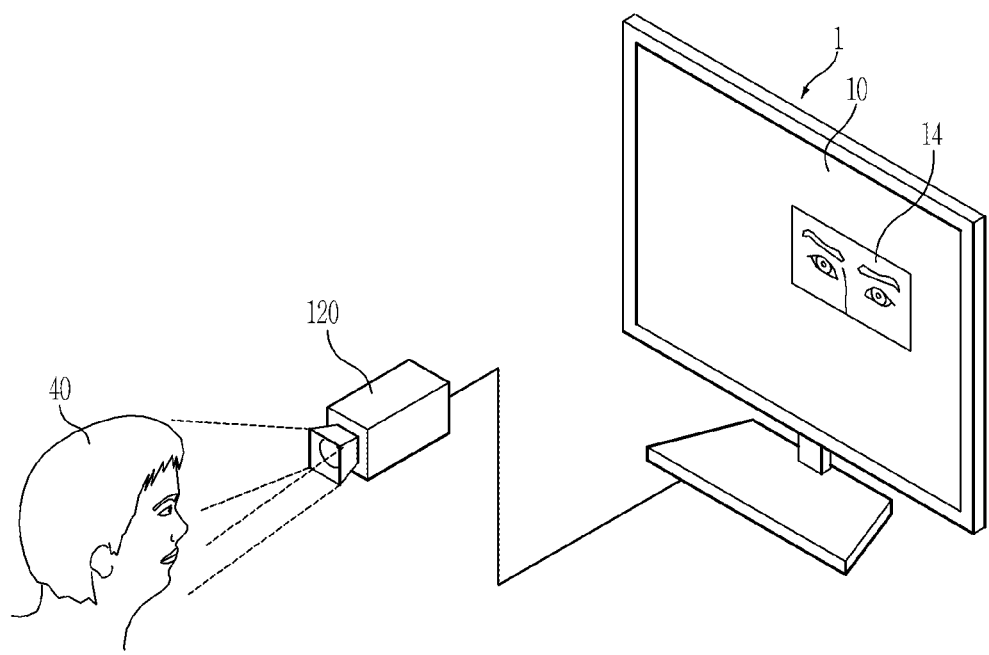
FIGS. 4 and 5 are views illustrating processes of color calibration of a display device in accordance with other exemplary embodiments of the inventive concept.
Figure 5:
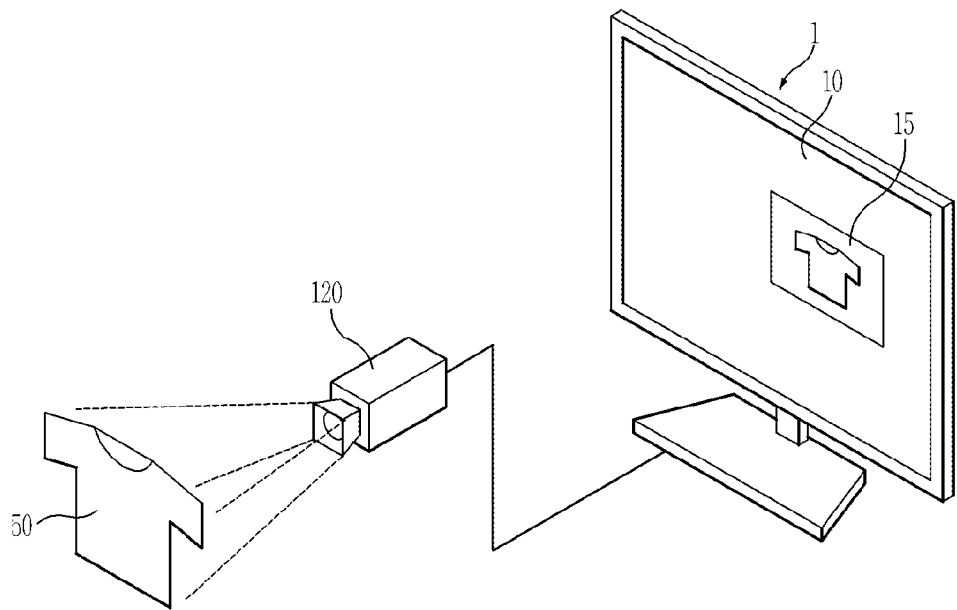

FIGS. 4 and 5 are views illustrating color calibration processes of a display device in accordance with other exemplary embodiments of the inventive concept.

With reference to FIGS. 4 and 5, a subject 40 or 50 is photographed by the image acquisition device 120. Then, the image of the subject 40 or 50 acquired through photographing by the image acquisition device 120 is transmitted to the display, and is displayed at an arbitrary region of the screen 10 of the display.

The subject may be a specific part 40 of a human body, as shown, for example, in FIG. 4. The exemplary embodiment shown in FIG. 4 is applied to a telemedicine system. Color calibration is carried out so that the image acquired through photographing by the image acquisition device 120 reproduces actual colors of the human body, and the image of the human body in which color calibration has been carried out is transmitted through a network. Thereby, an expert, such as a doctor, may confirm actual colors of a specific part of the human body of a patient. Thus, the accuracy and reliability of telemedicine may be increased.

Further, the subject may be a specific article 50, as shown for example in FIG. 5. The exemplary embodiment shown in FIG. 5 is applied to home shopping. Color calibration is carried out so that the image acquired through photographing by the image acquisition device 120 reproduces actual colors of the article, and the image of the article in which color calibration has been carried out is transmitted through a network. As a result, a consumer may confirm the actual colors of the article and may then purchase the article, in a manner preventing trouble resulting from a color difference.

If the subject is photographed directly by the image acquisition device 120, the color measurer 130 is not used. The image of the subject 14 or 15 acquired through photographing by the image acquisition device 120 is displayed on the screen 10 of the display, and a user may select profile information stored in advance in the memory 140 or may input information including at least one of luminance, color gamut, gamma and white balance, through the input 10. The color calibrator 150 generates a profile to calibrate colors of the image acquired through photographing by the image acquisition device 120, according to user input. Here, the generated profile includes information, such as luminance, color gamut, gamma, white balance, etc.

The profile generated by the color calibrator 150 is stored in the memory 140, and thus the user may subsequently select through a menu a setting item of the profile.

Figure 6:
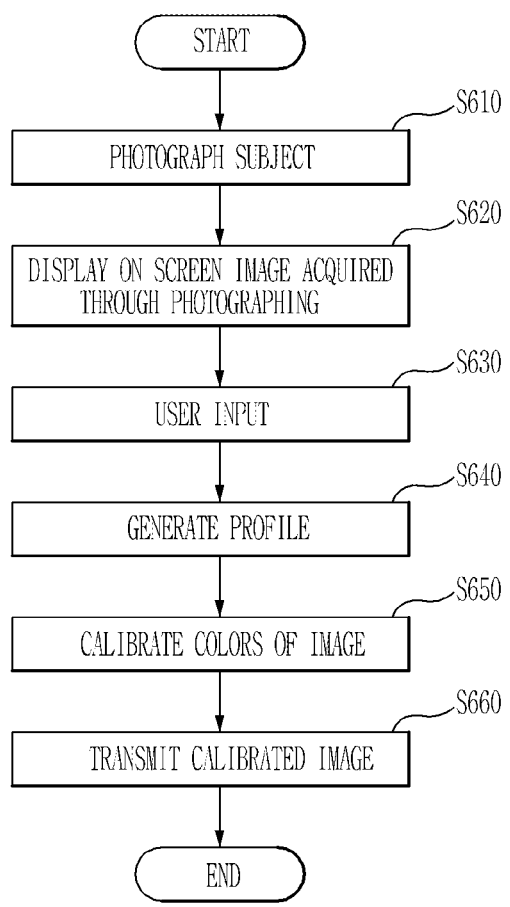
FIG. 6 is a flowchart illustrating a method of calibrating color of a display device in accordance with another exemplary embodiment of the inventive concept.

FIG. 6 is a flowchart illustrating a method of calibrating color of a display device in accordance with another exemplary embodiment of the inventive concept.

With reference to FIG. 6, the color calibration method of the display device 1 includes photographing the subject 40 or 50 using the image acquisition device 120, displaying on the screen 10 of the display 180 an image acquired through photographing by the image acquisition device 120, and calibrating colors of the image, according to user input.

First, the image acquisition device 120 acquires an image by photographing the subject 40 or 50 (Operation S610). That is, the image acquisition device 120 photographs an arbitrary subject 40, which has been designated in advance by a user, and transmits an image signal of the subject 40, acquired through photographing, to the color calibration unit 150.

Thereafter, the image of the subject acquired by the image acquisition device 120 is displayed on the screen of the display 180 (Operation S620). The image signal acquired by the image acquisition device 120 is transmitted to the controller 160 through the color calibrator 150, and the controller 160 drives the display 180 so that the image of the subject 40 or 50 acquired by the image acquisition device 120 is displayed on the screen 10.

Thereafter, user input is received (Operation S630). The user inputs profile information using click buttons or a touch panel formed on the display device 1 or a remote controller applied to the display device 1. The user may select profile information stored in advance, or may input information including at least one of luminance, color gamut, gamma and white balance.

Thereafter, a profile to calibrate colors of the image of the subject acquired by the image acquisition device 120 is generated according to user input (Operation S640). The color calibrator 150 receives profile information input by the user from the input 110. Then, the color calibrator 150 generates a profile to reproduce colors of the display 180 according to profile information input by the user. Here, the generated profile is not to reproduce optimized colors of the display 180 but rather is to reproduce colors of the display 180 according to a judgment of the user.

Thereafter, the color calibrator 150 calibrates colors of an image acquired through photographing by the image acquisition device 120 using the generated profile (Operation S650). That is, the color calibrator 150 uses the profile to calibrate colors of the image signal received from the image acquisition device 120. As a result, the image acquired by the image acquisition device 120 reproduces color characteristics selected by the user.

The color calibrator 150 calibrates the colors of the image of the subject which has been acquired by the image acquisition device 120, and the image of the subject, the colors of which have been calibrated, may be displayed on the screen 10 of the display 180. As a result, the user may confirm the image of the subject 14 or 15, the colors of which have been calibrated. Then, in response to the image of the subject 14 or 15, the colors of which have been calibrated, almost coinciding with a target image of the subject, the profile generated by the color calibrator 150 may be accepted. Further, in response to the image of the subject 14 or 15, the colors of which have been calibrated, not coinciding with the target image of the subject, the user may again input the profile information. Resultingly, the display device 1 repeats a process of receiving user input and generating a profile according to the received user input. That is, the user may adjust profile information to calibrate colors while comparing actual colors of the subject 40 or 50 seen with the naked eye with the calibrated colors of the image of the subject displayed on the screen 10 of the display 180.

Thereafter, the image, the colors of which have been calibrated, may be transmitted through a network (Operation S660). Here, the image transmitter 190 may perform pretreatment, encoding and packetization of the received image signal, the colors of which have been calibrated, and may transmit the image signal through a multimedia over internet protocol (MoIP).

Figure 7:
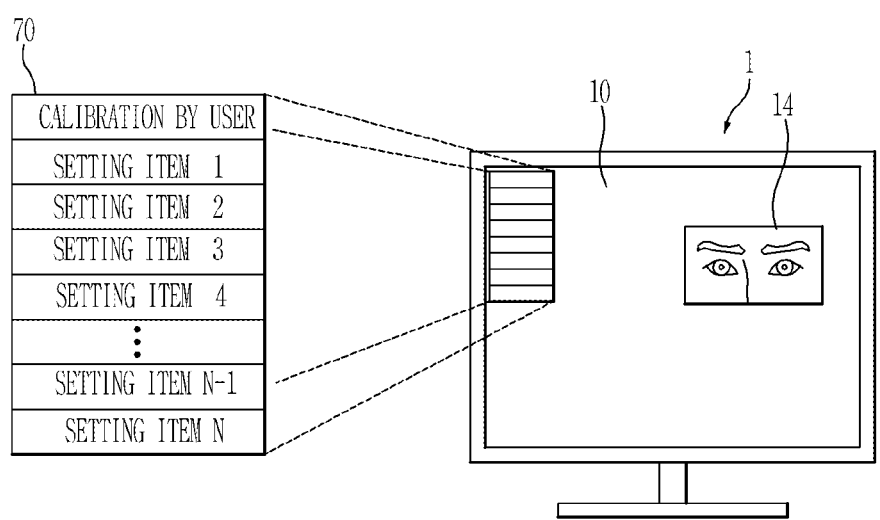
FIGS. 7 and 8 are views schematically illustrating a process of receiving profile information input by a user of the display device of FIG. 6.
Figure 8:
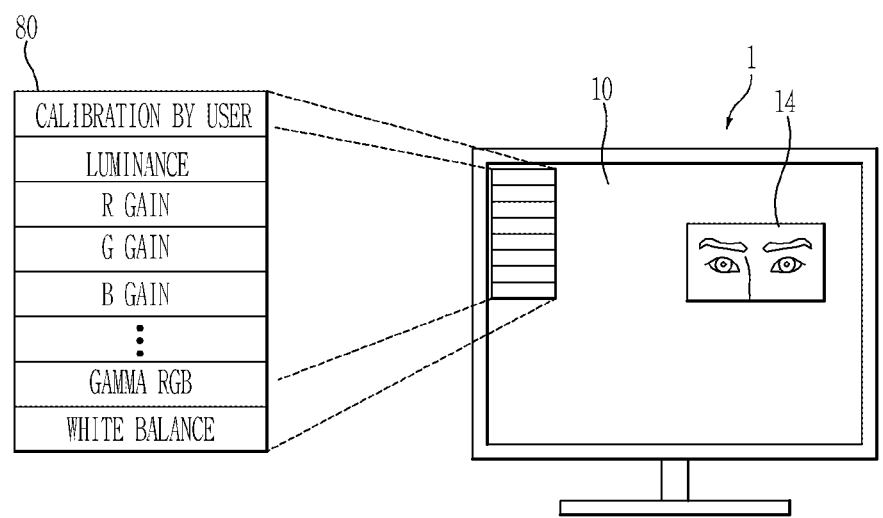

FIGS. 7 and 8 are views schematically illustrating a process of receiving profile information input by a user of the display device of FIG. 6.

With reference to FIG. 7, an image 14 of a subject (a specific part of a human body) acquired through photographing by the image acquisition device 120 is displayed at an arbitrary region of the screen 10 of the display. Further, the subject image 14 displayed on the screen 10 of the display may be a subject image, colors of which have been calibrated by the color calibrator 150. That is, the subject image acquired by the image acquisition device 120 may be initially displayed on the screen 10 of the display. The colors of the subject image acquired by the image acquisition device 120 may be calibrated according to user input, and then the image, the colors of which have been calibrated, may be displayed on the screen 10 of the display.

A menu 70 is displayed on the upper region of the left portion of the screen 10 of the display so as to allow a user to select profile information which has been stored in advance. The profile information stored in advance includes setting items 1 to N, and is displayed on the menu 70. A user selects one setting item, and the colors of the image acquired by the image acquisition device 120 are calibrated according to the setting item selected by the user.

With reference to FIG. 8, an image 14 of a subject (a specific part of a human body) acquired by the image acquisition device 120 is displayed at an arbitrary region of the screen 10 of the display. Further, the subject image 14 displayed on the screen 10 of the display may be a subject image, colors of which have been calibrated by the color calibrator 150. That is, the subject image acquired by the image acquisition device 120 may be initially displayed on the screen 10 of the display, the colors of the subject image acquired by the image acquisition device 120 may be calibrated according to user input, and then the image, the colors of which have been calibrated, may be displayed on the screen 10 of the display.

A menu 80 is displayed on the upper region of the left portion of the screen 10 of the display so as to allow a user to directly input profile information. The profile information directly input by the user includes items of luminance, R gain, G gain, B gain, gamma RGB and white balance, and is displayed on the menu 80. A user selects one item, and directly inputs a value of the selected item. On the other hand, the user may sequentially select different items, and input values of the selected items. Then, the colors of the image acquired by the image acquisition device 120 are calibrated according to the profile information input by the user.

As is apparent from the above description, in a display device and a method of calibrating color in accordance with one exemplary embodiment of the inventive concept, colors of an image acquired by an image acquisition device are calibrated so as to reproduce actual colors, and, in response to the image acquired by the image acquisition device being transmitted to another display device through a network, the display device receiving the image may reproduce the image of the actual colors. Further, a user of the display device may perform color calibration so that the colors of the image acquired by the image acquisition unit coincide with the actual colors seen with the naked eye while confirming in real time the image acquired by the image acquisition device.

Although a few exemplary embodiments of the inventive concept have been shown and described, it would be appreciated by those skilled in the art that changes may be made in these exemplary embodiments without departing from the principles and spirit of the invention, the scope of which is defined in the claims and their equivalents.

What is claimed is:

1. A display device comprising:
   an image acquisition device for photographing a reference color standard;
   a display which displays a screen comprising a first region, in which the reference color standard is displayed, and a second region in which a color standard, which is acquired by photographing the reference color standard through the image acquisition device, is displayed;
   a color measurer which measures color of the acquired color standard displayed on the second region of the screen of the display; and
   a color calibrator which calibrates colors of an image acquired through photographing by the image acquisition device using color information measured by the color measurer.

2. The display device according to claim 1, wherein the color of the acquired color standard is measured at different positions of the second region of the screen by the color measurer.

3. The display device according to claim 2, wherein the color calibrator calibrates the color of the color standard acquired by the image acquisition device, and the display displays on the screen the color standard, the color of which has been calibrated.

4. The display device according to claim 3, further comprising an image transmitter which transmits the image through a network, the colors of which have been calibrated.

5. The display device according to claim 4, wherein the image transmitter transmits the image, the colors of which have been calibrated, using a multimedia over internet protocol (MoIP).

6. A method of calibrating color of a display device, the method comprising:

displaying a reference color standard on a screen of a display, and photographing the reference color standard through an image acquisition device;

displaying a screen comprising a first region, in which the reference color standard is displayed, and a second region in which a color standard, which is acquired by photographing the reference color standard through the image acquisition device, is displayed, and measuring color of the acquired color standard displayed on the second region of the screen through a color measurer; and calibrating colors of an image acquired through photographing by the image acquisition device using color information measured by the color measurer.

7. The method of calibrating color according to claim 6, further comprising calibrating the color of the color standard acquired by the image acquisition device, and displaying on the screen of the display unit the color standard, the color of which has been calibrated.

8. The method of calibrating color according to claim 7, further comprising transmitting the image, the colors of which have been calibrated, through a network.

9. The method of calibrating color according to claim 8, wherein, in the transmission of the image, the colors of which have been calibrated, the image, the colors of which have been calibrated, is transmitted using a multimedia over internet protocol (MoIP).

10. A display device comprising:

a display which displays a screen comprising a first region, in which a reference color standard is displayed, and a second region in which a received color standard is displayed;

a color measurer which measures color of the received color standard; and a color calibrator which calibrates colors of an image acquired using color information measured by the color measurer.

11. The display device of claim 10, further comprising:

an image acquisition device for photographing the reference color standard;

wherein the received color standard is acquired by photographing the reference color standard through the image acquisition device.

12. The display device of claim 11, wherein the image calibrated by the color calibrator is acquired by the image acquisition device.

13. The display device according to claim 12, further comprising an image transmitter which transmits the image with the calibrated colors through a network.

* * * * *